July 30, 1957 K. S. KNOL ET AL 2,801,299

IMPROVED ULTRA-HIGH FREQUENCY AMPLIFIER

Filed July 21, 1954

INVENTORS
KORNELIS SWIER KNOL
JAN DAVIDSE

BY Fred M Vogel

AGENT

United States Patent Office 2,801,299

Patented July 30, 1957

2,801,299

IMPROVED ULTRA-HIGH FREQUENCY AMPLIFIER

Kornelis Swier Knol and Jan Davidse, Eindhoven, Netherlands, assignors, by mesne assignments, to North American Philips Company, Inc., New York, N. Y., a corporation of Delaware Application July 21, 1954, Serial No. 444,844

Claims priority, application Netherlands August 4, 1953

1 Claim. (Cl. 179—171)

This invention relates to amplifiers of ultra-high frequency oscillations, in which the input impedance is connected between the grid and the cathode and the output impedance is connected between the anode and the cathode of an electron discharge tube.

In amplifiers of high-frequency oscillations it is known to compensate undue reaction of the output circuit on the input circuit via internal capacities between the electrodes of the amplifier tube by connecting that end of the input impedance, which is not connected to the grid, via a capacitor to the anode and via a second capacitor to the cathode.

Figure 1:
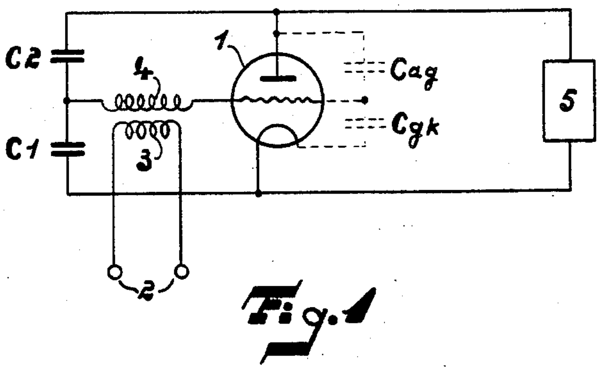
Figure 2:
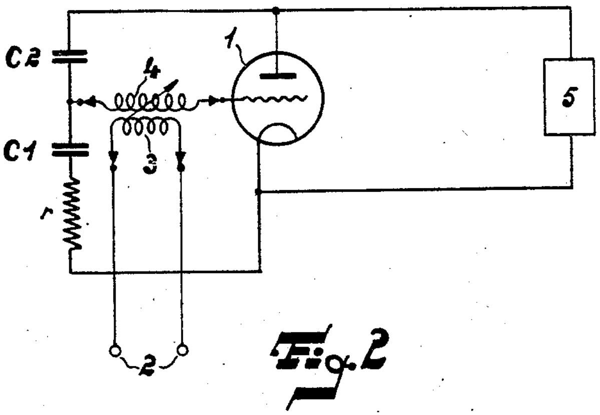

In order that the invention may be readily carried into effect, it will now be described, by way of example, with reference to the accompanying drawing in which:

Fig. 1 is a schematic diagram of a neutralized ultra-high frequency amplifier circuit; and Fig. 2 is a schematic diagram of a neutralized ultra-high frequency amplifier circuit compensated for the input-conductance of the amplifier tube in accordance with the present invention.

In Figs. 1 and 2 the static supply voltages are not shown, in order to enhance the clarity of presentation.

In Fig. 1, a triode 1 functions as an amplifier tube. The oscillations to be amplified are supplied between terminals 2 to which is connected a winding 3 which is coupled to an input impedance 4 of the tube 1. An output impedance 5 is connected between the anode and the cathode of the tube 1. The stray capacities between the anode and the control grid, and the control grid and the cathode are denoted by $C_{ag}$ and $C_{gk}$ respectively. The reaction of the output circuit on the input circuit through the last-mentioned capacity is, as is known, compensated by providing a first capacitor between the anode and the end of the inductance 4 remote from the control grid, and a second capacitor between the last-mentioned point and the cathode. Said capacitors are designated $C_2$ and $C_1$ respectively. Neutralization is attained by choosing the capacitors $C_1$ and $C_2$ to be such that $$C_1:C_2=C_{gk}:C_{ag}$$

In this case the bridge circuit comprising the various capacitors is in equilibrium, and if a voltage is operative at the anode, as little voltage as possible occurs across the input coil.

Furthermore, it is known that the amplification diminishes accordingly as the frequency of the oscillations to be amplified increases, as a result of the ever increasing losses by which the circuits, in particular the input circuit, are damped. In Fig. 1 it may be assumed that the coil 4, in combination with the capacities present in the circuit, is tuned to the frequency of the oscillation to be amplified. There are mainly two kinds of damping of the input circuit; these are travel time damping and self-induction damping. The former is due to the fact that at high frequencies the transit time of the electrons between the cathode and the anode forms a comparatively large part of the cycle of the oscillations to be amplified.

The latter results from the naturally present self-induction of the various leads notably from the self-induction of that part of the cathode lead which is common to the input circuit and the output circuit.

The damping finds expression in the reciprocal value of an equivalent resistor which may be imagined to be connected between the grid and the cathode of the tube 1. The smaller the value of the said resistor, the greater the damping. The travel time damping may, to a first approximation, be expressed by $$1/R_t=\frac{1}{20}S\omega^2\tau_{kg}^2$$

where $R_t$ represents the equivalent loss resistance, $\omega$ is the angular velocity frequency, S is the mutual conductance of the tube 1, and $\tau_{kg}$ is the transit time of the electrons between the cathode and the grid.

The self-induction damping is expressed by $$1/R_L=\omega^2 C_{gk} L_k S$$

where $R_L$ represents the equivalent loss resistance, and $L_k$ is the self-induction of the cathode lead, inasmuch it is common to the input circuit and the output circuit. In the case of a double cathode lead the same expression is obtained.

The two types of damping are proportional to the square of the frequency.

The present invention is based on the realization that neutralization decreases with an increase in frequency, due to said loss resistances.

The present invention has for its object to provide a circuit-arrangement yielding satisfactory neutralization even at high frequencies of the oscillations to be amplified and consists in that a resistor is connected in series or in parallel with the second capacitor.

If the amplifier is not tunable the resistor may be connected at will in series or in parallel with the capacitor. If, however, tuning means are provided for the input circuit neutralization for a wide frequency range is only possible if the resistor is connected in series with the capacitor.

Fig. 2 is a schematic diagram of a neutralized ultra-high frequency amplifier circuit compensated for the input conductance of the amplifier tube in accordance with the present invention. The compensating resistor is represented by $r$. The input circuit is assumed to be stepwise tunable by changing of the inductance L which may be varied, for example, by means of a movable magnetic core (not shown in the figures).

The series-combination of $C_1$ and $r$ may be imagined to be transformed into the parallel-combination of a capacitor and a resistor which depend upon the frequency. This resistor is found to be proportional, at least to a first approximation, to the square of the frequency. When the resistor $r$ is given a suitable value, the equilibrium of the bridge comprising the several capacities, the loss resistance and the resistor $r$, may be maintained independently of the frequency. In this case the amplifier circuit of the present invention is suitable for amplifying oscillations of frequencies extending over a wide range up to about 1000 megacycles per second.

The resistor $r$ should have a value of approximately 20 ohms.

In one embodiment of the amplifier circuit of the present invention comprising a triode as an amplifier tube, $C_{gk}$ and $C_1$ each had values of 2.3 micromicrofarads. The input damping was 160 $\mu$A/V, and consisted for the greater part of travel time damping and self-induction damping, both of which are proportional to the square of the frequency, the remainder substantially being loss due to skin effect, which is proportional to $\omega^{2,5}$ and may also be compensated in part. Upon calculation the desired compensation for damping variation is found to be obtained with a compensating resistance *r* having a value of 19 ohms. The total damping of the input circuit will naturally increase due to the resistor *r*.

The circuit-arrangement of the present invention has the advantage that substantially perfect neutralization is obtained in amplifiers for very high frequencies and the reaction of the output circuit on the input circuit does not practically vary upon frequency variations of the oscillations to be amplified. Thus, the stability remains constant and more even amplification is insured.

It is to be understood that the invention is not limited to the details disclosed but includes all such variations and modifications as fall within the spirit of the invention and the scope of the appended claim.

What is claimed is:

An amplifier circuit comprising an electron discharge tube having an anode, a cathode and a grid, said tube having internal capacities between said cathode and grid and between said grid and anode, a signal input impedance connected at an end thereof to said grid, a source of an input signal, means connected to apply said input signal to said input impedance, a first neutralizing capacitor connected between said anode and the remaining end of said input impedance, a second neutralizing capacitor and a resistor connected in series between said cathode and said remaining end of the input impedance, and an output signal circuit connected between said anode and said cathode, said first and second neutralizing capacitors having values of capacitance so as to neutralize said internal capacities of the tube, and said resistor having a value of resistance to compensate for the input conductance of said tube thereby rendering the neutralization of said internal capacities effective over an extended frequency range of said input signal.

References Cited in the file of this patent

UNITED STATES PATENTS

| | | |
|---|---|---|
| 1,905,826 | Elliot | Apr. 25, 1933 |
| 2,299,366 | Van Der Ziel et al. | Oct. 20, 1942 |
| 2,686,232 | Korman | Aug. 10, 1954 |

FOREIGN PATENTS

| | | |
|---|---|---|
| 897,723 | Germany | Nov. 23, 1953 |

OTHER REFERENCES

"Fund. of Electron Tubes" (Eastman), published by McGraw-Hill (New York), 1949. (Page 426, Figs. 10–29 relied on.)